(12) United States Patent
Neystadt et al.

(10) Patent No.: US 11,086,695 B2
(45) Date of Patent: Aug. 10, 2021

(54) DISTRIBUTED EVENT MANAGEMENT

(71) Applicant: ARM LTD, Cambridge (GB)

(72) Inventors: John Eugene Neystadt, Kfar-Saba (IL); Alon Shamir, Zofit (IL)

(73) Assignee: Arm Limited, Cambridge (GB)

( * ) Notice: Subject to any disclaimer, the term of this patent is extended or adjusted under 35 U.S.C. 154(b) by 106 days.

(21) Appl. No.: 16/477,640

(22) PCT Filed: Jan. 15, 2018

(86) PCT No.: PCT/GB2018/050094
§ 371 (c)(1),
(2) Date: Jul. 12, 2019

(87) PCT Pub. No.: WO2018/130851
PCT Pub. Date: Jul. 19, 2018

(65) Prior Publication Data
US 2020/0125425 A1    Apr. 23, 2020

(30) Foreign Application Priority Data
Jan. 16, 2017    (GB) .................................. 1700728

(51) Int. Cl.
*G06F 9/54*    (2006.01)
*G06F 9/50*    (2006.01)
(Continued)

(52) U.S. Cl.
CPC ............ *G06F 9/542* (2013.01); *G06F 9/5027* (2013.01); *G06F 11/3013* (2013.01); *G06F 11/3027* (2013.01); *G06F 11/3688* (2013.01)

(58) Field of Classification Search
CPC .... G06F 9/5027; G06F 9/542; G06F 11/3013; G06F 11/3027; G06F 11/3688
See application file for complete search history.

(56) References Cited

U.S. PATENT DOCUMENTS

2003/0041095 A1\* 2/2003 Konda .................. G06F 16/258
709/201
2006/0230043 A1    10/2006 Sumner-Moore
(Continued)

FOREIGN PATENT DOCUMENTS

EP    2 891 985    7/2015
GB    2503436      1/2014
(Continued)

OTHER PUBLICATIONS

Combined Search and Examination Report for GB Application No. 1700728.7 dated Jun. 12, 2017, 10 pages.
(Continued)

*Primary Examiner* — Tuan C Dao
(74) *Attorney, Agent, or Firm* — Nixon & Vanderhye P.C.

(57) ABSTRACT

An electronic event processing component operable at a level in a hierarchy of components and adapted for operation in electronic communication with at least one further electronic component operable at a different level in a hierarchy of electronic components, and operable according to at least one rule triggered by at least one event; and responsive to said at least one event, activating a communication component to cause performance by at least one of said electronic event processing component and said further electronic component of said at least one associated action according to said at least one rule.

13 Claims, 4 Drawing Sheets

(51) Int. Cl.
*G06F 11/30* (2006.01)
*G06F 11/36* (2006.01)

(56) References Cited

U.S. PATENT DOCUMENTS

| | | | |
|---|---|---|---|
| 2006/0230077 A1 | 10/2006 | Satou et al. | |
| 2008/0297305 A1 | 12/2008 | Little | |
| 2010/0125584 A1* | 5/2010 | Navas | G06F 16/2255 707/747 |
| 2010/0332630 A1* | 12/2010 | Harlow | H04L 41/048 709/221 |
| 2012/0254982 A1* | 10/2012 | Sallam | G06F 21/564 726/16 |
| 2014/0372359 A1 | 12/2014 | Greborio et al. | |
| 2014/0380425 A1* | 12/2014 | Lockett | H04L 63/08 726/4 |
| 2015/0242253 A1* | 8/2015 | Isoyama | G06F 9/5027 719/318 |
| 2017/0242990 A1* | 8/2017 | Chien | H04L 9/32 |
| 2017/0300629 A1* | 10/2017 | Ross | G16H 10/60 |
| 2017/0346823 A1* | 11/2017 | Wadley | H04W 12/08 |

FOREIGN PATENT DOCUMENTS

| | | |
|---|---|---|
| GB | 2516729 | 2/2015 |
| WO | 2015/130763 | 9/2015 |

OTHER PUBLICATIONS

Examination Report for GB Application No. 1700728.7 dated Nov. 23, 2018, 7 pages.
International Search Report and Written Opinion of the ISA for PCT/GB2018/050094 dated Apr. 3, 2018, 17 pages.
Examination Report for GB Application No. 1700728.7 dated Jun. 4, 2020, 4 pages.

* cited by examiner

DISTRIBUTED EVENT MANAGEMENT

This application is the U.S. national phase of International Application No. PCT/GB2018/050094 filed Jan. 15, 2018 which designated the U.S. and claims priority to GB 1700728.7 filed Jan. 16, 2017, the entire contents of each of which are hereby incorporated by reference.

The present technology relates to apparatus and methods for operating electronic systems to manage events. Event processing (or sometimes "event driven processing") refers to a technique of the computing art in which data processing takes place as a result, not of instigation by an operator, but of the automated detection of an event, such as a signal from a sensor or a state change (such as the crossing of a predetermined threshold) in a connected system or device. The present technology relates particularly to event processing in networks of connected computing devices and associated network-connected services. Such associated network-connected services may comprise separate hardware entities and software components running on one or more hardware devices.

Electronic devices consume resources in the form of power, communication bandwidth over buses and networks, memory footprints, storage requirements, redundancy and backup requirements, and the like. It is an acknowledged fact among those of skill in the art that any electronic system, at some point in its life cycle, will encounter resource constraints. This is at least partly because device designs are typically planned to be "lean" in order to keep manufacturing costs low, while meeting the design requirements of expected users as those requirements are known at design time. For this reason, electronic devices and systems, once they have entered production use, often cannot allow for the sheer speed of future expansions in interconnected systems and advances in their uses.

Thus, to manage a system consisting of resource-constrained multiple devices belonging to different device classes, complex application and system control logic needs to be engineered. As described above, such devices are often constrained in battery power, network bandwidth and other resources, thus typically requiring limitations on the number of times a device is awakened to perform its processing functions and transmit information to a management system, the length of time it is to be operated, and the like. Event processing, typically requiring resources in the form of processing power, local memory and the like, presents particular difficulties in constrained environments as it may be somewhat resource-intensive. All these factors contribute to the demands faced by developers of such systems.

In a first approach to the many resource constraints encountered in event management, the described technology provides an electronic event processing apparatus, comprising a first electronic component, at a first level in a hierarchical arrangement, having an identifier and at least one associated action to be performed according to at least one rule triggered by at least one event; a second electronic component, at a second level in the hierarchical arrangement, and operable to receive from the first electronic component the identifier and a definition of the at least one rule; and a communication component connecting the first electronic component and the second electronic component and operable in response to the at least one event to cause performance by at least one of the first electronic component and the second electronic component of the at least one associated action according to the at least one rule.

Implementations of the disclosed technology will now be described, by way of example only, with reference to the accompanying drawings, in which.

Figure 1:
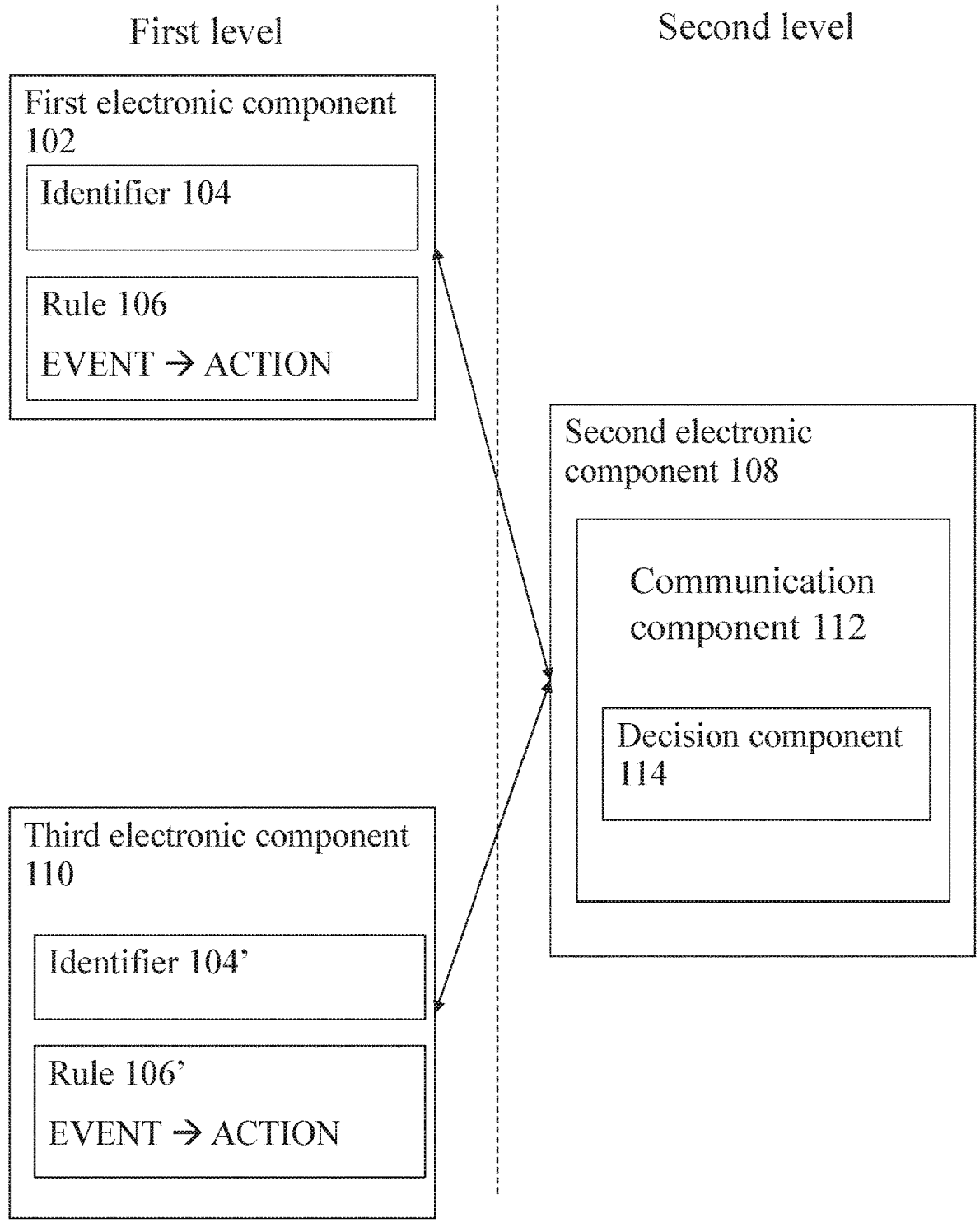
FIG. 1 shows an embodiment of an event management apparatus according to the presently described technology.

In FIG. 1, there is shown an embodiment of an event management apparatus 100, comprising first electronic component 102, second electronic component 108, third electronic component 110, and communication component 112 (shown here in exemplary form as contained within second electronic component 108—but this need not be the case). First and third electronic components 102, 10 are located at a first level in a hierarchy of components and provided respectively with identifiers 104, 104' and at least one rule 106, 106'. Each of rules 106, 106' relates a detected event to at least one action to be taken. Each of first and third electronic components 102, 110 is operable to enter into electronic communication with second electronic component 108, which is located at a second level in said hierarchy, by means of communication component 112. In one embodiment, communication component 112 in second electronic component 108 may be provided with a decision component 114, operable to test and decide upon the component or components within which an event is to trigger the performance of an action according to rules 106, 106'. Decision component 114 may also comprise subcomponents that may be shared among components so that event processing may be accomplished in the most economical manner.

First, second and third electronic components 102, 108, 110 may comprise, for example, one or more hardware, software or hybrid hardware/software components residing or operable on discrete processing devices such as computers, on a network of such devices, or on virtualised devices arranged in a network, such as, for example, a grid or cloud computing arrangement. The computers may include, for example, Internet of Things (IoT) devices, such as networked sensors, consumer devices, intelligent home systems, automotive systems or the like, which may have intermittent network connectivity or power supply availability (being typically battery-powered, they may suffer from reduced battery charge levels at times). Communication component 112 may comprise a local channel within a single platform or it may comprise networked means for communication between platforms.

Figure 2:
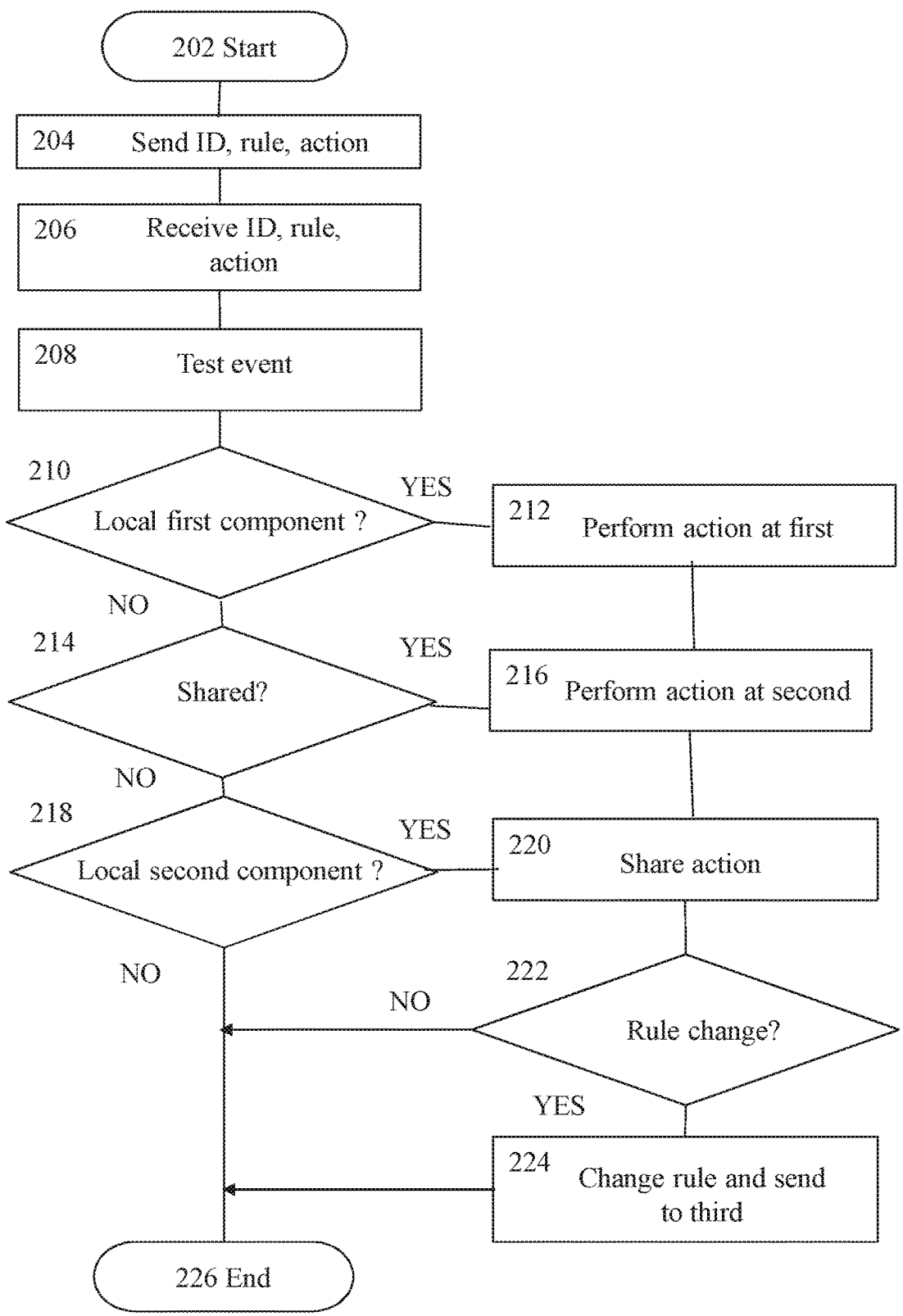
FIG. 2 shows an example of a machine-implemented method of operation according to the presently described technology.

In FIG. 2 is shown machine-implemented method 200, which commences at Start step 202. At step 204, a first electronic component, located at a first level in a hierarchy of components, sends an identifier and a definition of a rule and its associated event to a second electronic component, located at a second level in a hierarchy of components, which receives the identifier and the definition at step 206. The system then proceeds in operation until an event is signalled. At step 208, the second electronic component or a communication component (such as communication component 112 of FIG. 1) therein tests an event that has been so signalled. At test step 210, a determination is made whether the event is one that requires performance locally at the first electronic component. If the determination is positive, at step 212 the associated action of the rule is performed at the first electronic component. If the determination is negative, test step 214 is invoked to determine whether the event is one that requires performance in a shared manner at both the first and the second electronic component. If the determination is positive, at step 216 the associated action of the rule is performed cooperatively between the first and second electronic component. If the determination is negative, test step 218 is invoked to determine whether the event is one that requires performance locally at the second electronic component. If the determination is positive, at step 220 the associated action of the rule is performed at the second electronic component. If the determination is negative, for example, if the event is not recognised or has no associated rule and action, the process ends at End step 216. End step 216 may, in implementations, be replaced by a loop back to an earlier step in the process, for example, to step 208. The process may thus continue in an iterative fashion during an operating period of the apparatus. In this manner, the task of managing events may be distributed across components within the distributed system, thereby ameliorating restrictions caused by resource constraints of the electronic devices.

Where a determination at any of test steps 210, 214, 218 is positive and actions associated with the respective rules have been performed at steps 212, 216, 220, a further test step is performed at 222. Test step 222 determines whether the event requires a rule change. If the determination is positive, at step 224, the rule is changed and the changed version of the rule is sent to a third electronic component. After step 224, or if the determination at test step 222 was negative, the process ends at End step 226. The process may, in an alternative, continue in an iterative fashion during an operating period of the apparatus.

The burden of processing events can thus be controlled by testing the event and, responsive to a determination that the associated rule is local to an electronic component, causing performance of the associated action by that electronic component. Similarly, responsive to a determination that the rule is shared by electronic components the process may be shared by those components. If the event comprises a rule change, the rule change may be communicated to relevant components, for example based on a device class definition.

Figure 3:
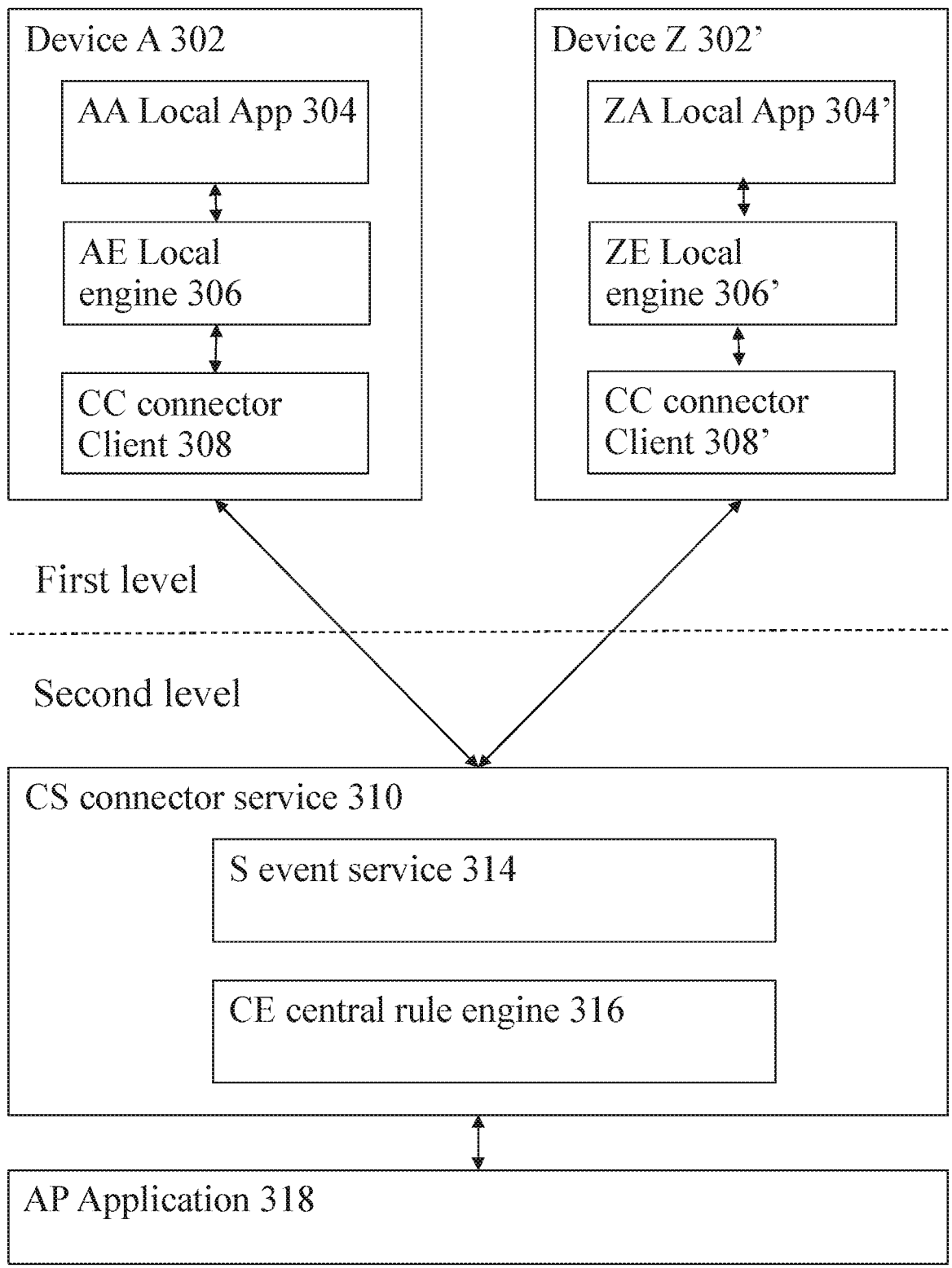
FIG. 3 shows a simplified example of a network of electronic devices operable according to the presently described technology.

In FIG. 3 is shown a simplified exemplary embodiment of a network 300 of electronic devices operable according to the presently described technology. Network 300, for the purposes of this description, has been shown as comprising only two devices: Device A 302 and Device Z 302', corresponding to first and third electronic components 102, 110 of FIG. 1. Device A 302 and Device Z 302' are located at a first level of a hierarchy of components. In a real-world implementation, there would likely be many more devices. Device A 302 comprises AA Local App 304, AE Local engine 306, and CC connector client 308. Device Z 302' comprises ZA Local App 304', ZE Local engine 306', and CC connector client 308'. Device A 302 and Device Z 302' are operable, respectively, to communicate electronically with CS connector service 310 using CC connector clients 308, 308' (CS connector service 310 corresponds to second electronic component 108 of FIG. 1). The electronic communication may be intra-system, where the component parts of the system are hosted on a single platform, or may be intersystem, where the component parts of the system are hosted on separate platforms. CS connector service 310 is located at a second level in said hierarchy of components. CS connector service 310 comprises S event service 314 and CE central rule engine 316. CS connector service 310 is operable to communicate electronically with AP application 318.

The network 300 can thus be seen as comprising a distributed event processing rule engine, having at least the following components:
1. One or more event processing agents in each device at the first level of the hierarchy of components.
2. Centralized components (such as AP application 318) typically located in a Cloud Service or Gateway node at a second level in the hierarchy of components.
3. A Central Connector Service (shown as CS connector service 310) and a Connector Client (CC). The connector client may be a client as defined in the Open Mobile Alliance Lightweight Machine-to-machine (OMA LWM2M) standard. Connector Service and Connector Client cooperate to provide electronic communication between devices at the first level and devices at the second level and to permit distribution of event management tasks across devices.

In an embodiment, the rules for management of event processing in such a system may be structured as follows:
Id: A unique identifier of the rule;
Condition: A condition to be met, to trigger the rule's action.
Action: One or more actions to be invoked when the condition is met.
Condition may include:
  Class: Local device or a class of matching devices.
  Resource: A device resource to be watched. This could be a Constrained Application Protocol (CoAP) resource or other resource registered previously on the device.
  Condition: E.g. equals, smaller, bigger, average; count, sum, etc.
  Threshold: Minimum number of event instances to satisfy.
  Value: Value of a condition.
  Interval: Time interval during which condition must be met.
Action can be one of the following exemplary types:
  DeviceAction Action:
    Device Class: Local device (in case condition was also specified as local) or a Class of a devices to which to apply the action.
    Action Id: A registered action on the device.
    Action Parameter: A calculated Action parameter—an output of a complex programming expression, which can include a condition value that was met.
  SendEvent Action:
    Action Id: A registered action on the device.
    Action Parameter: A calculated Action parameter—an output of a complex programming expression, which can include a condition value that was met.
  ChangeRule Action:
    Rule Operation: Create/Delete/Update a rule.
    Rule ID: An existing rule ID.
    Device Class: Class of a devices on which to apply the action.
    New Rule: New Rule definition.
    Application Action (such as a RESTful URL to be invoked):
      Action Id: A registered application action.
  Action Parameter: A calculated Action parameter—an output of a complex programming expression, which can include condition value that was met.

Figure 4:
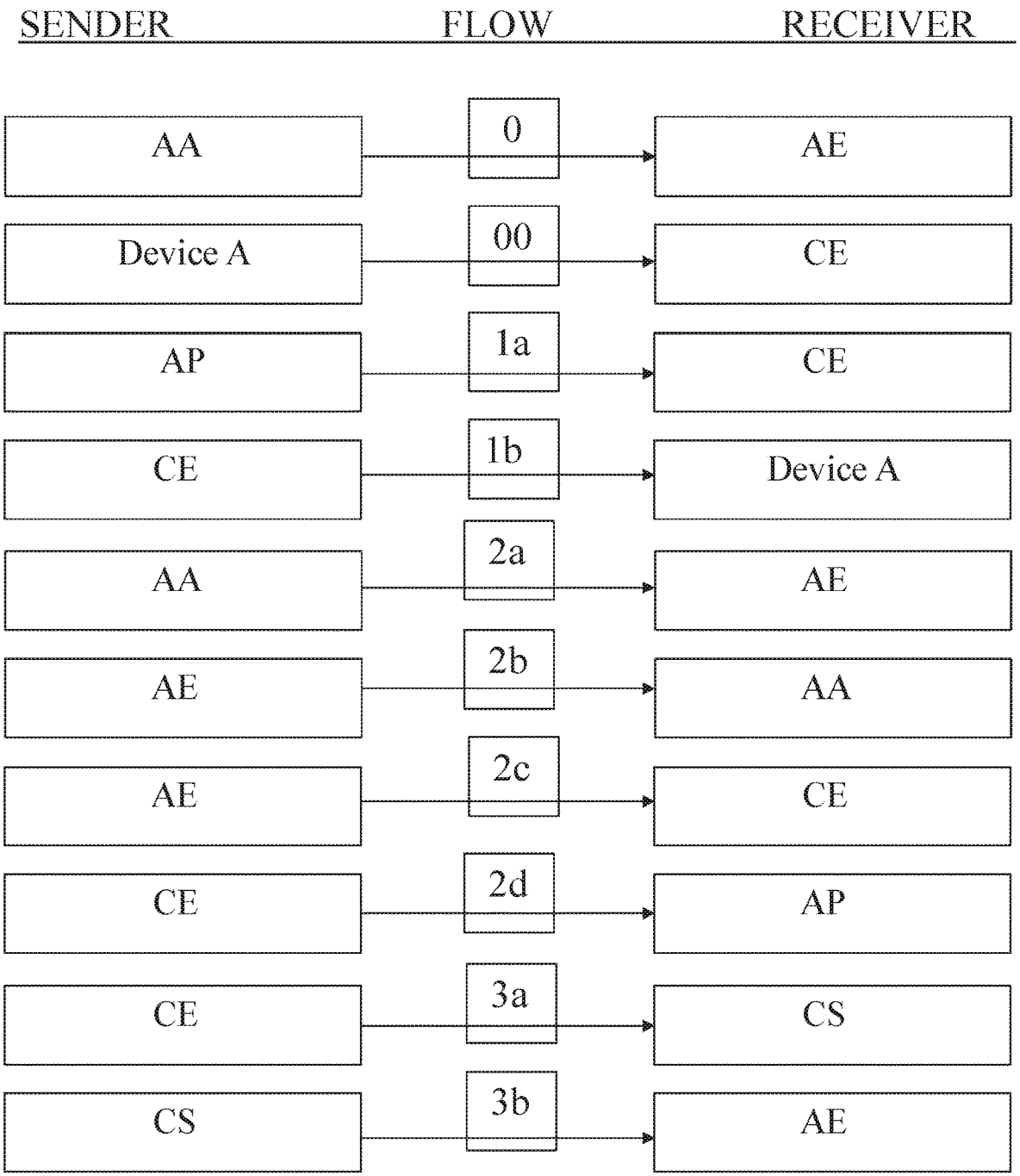
FIG. 4 shows a sequence of exemplary flows within a network of electronic devices operable according to the presently described technology.

Turning now to FIG. 4 (with occasional reference to the components of FIG. 3), the processing and communication flows within the system proceed as follows during the configuration phase of operations. First, each device (Device A . . . Z) registers (Flow 0) a list of local actions provided by software that runs locally on the device, providing information about actions to be triggered by particular events, the function entry points for the actions, and an Action Id for each action.

Second, each device registers (Flow 00) with the central node, providing its device-class. A device class could be a single unique device identifier, such as a UUID, or a class of group of devices—e.g., in a computer-controlled irrigation system, a class might be "sprinkler" or "moisture sensor".

Third, an application (AP of FIGS. 3 and 4) configures (Flow 1a) a Central Event Engine (CE) with a set of rules, each structured as described above, which completely predicate the logic of the required system behaviour.

The system configuration phase having been completed, the system proceeds as follows during the operational phase:

First, each device (e.g. Device A) may, once only or periodically, register or re-register (Flow 00) with Connector Service (CS), providing its device class, such as value="sensor" or value="sprinkler". In turn, each device receives (Flow 1b) a configuration with a set of rules applicable to that device or to its device class. Devices of different classes (e.g., in the irrigation system example, "sprinklers" or "sensors") may receive different subsets of rules, according to their class.

At any time during the operational phase, a local application (AA) running on the device, may interact with device hardware and send (Flow 2a) a local event to Local Engine (AE). Each time it receives an event, Local Engine (AE) iterates through its list of local rules and checks whether any rule is matched. To execute the matching for statistical condition rules, such as Count, Sum or Average, Local Engine (AE) keeps a list of local events received (Flow 2a) from Local App (AA) during the interval specified in the rule, and calculates the average/sum/count of the received values. Once rule condition has been met, Local Engine (AE) executes the action specified in the rule, according to the Action Type.

For action type=DeviceAction, local engine (AE) invokes (Flow 2b) a previously registered action with the corresponding ActionId, passing it the value of the Param in the matching rule that triggered the action.

For action type=SendEvent, local engine (AE) sends (Flow 2c), via Connector Client (CC), an event to a Central Rule Engine (CE), including the value of the Param in the matching rule that triggered the action.

For action type=ChangeAction, local engine (AE) finds a rule with a matching RuleId, and adds, removes or modifies the rule, according to NewRule parameter specified in matched rule action.

For action type=ApplicationAction, local engine (AE) sends an event (Flow 2c), via Connector Client (CC), which is passed (Flow 2d) to the Central Application (AP). This may be done, for example, to indicate an exception detected in the system. In the example of an irrigation system, an exceptional event may trigger an Application to send an SMS alert to a supervisor if indications of water leakage have been detected, Each time it receives (Flow 2c) an event, Central Rule Engine (CE) processes it according to the same logic as Local Engine (AE). To match a rule, it compares a Device-Class of the source device that sent an event to Class specified in the Rule Condition, keeps track of events with statistical conditions (Average, Count, Sum, etc.) and checks whether a statistical condition is satisfied during Interval period as specified in rule condition.

If a rule condition is matched, according to the Action-Type, the Central Rule Engine (CE) can proceed as follows.

For ActionType ModifyRule & DeviceAction, Central Rule Engine (CE) requests (Flow 3a) Connector Service (CS) to execute an action (as described below) on all devices registered during registration phase (Flow 00) with a class, that matches a DeviceClass matching the Rule Action. This causes the request (Flow 3b) to be passed to Local Engine (AE) via Connector Client (CC). When receiving (Flow 3b) an action request from Central Rule Engine (CE) via Connector Client (CC), Local Engine (AE) can proceed as follows.

For DeviceAction action, Local Engine (AE) can invoke (Flow 2b) one of the previously registered (Flow 0) action functions according to ActionId.

For ModifyRule action, Local Engine (AE) can look up an existing rule according to RuleId, and modify or delete one of the existing rules, or add a new rule.

For Application ActionType, the Central Rule Engine (CE) can trigger a previously registered (Flow 1a) URL on the Application (AP), passing matching value of the rule as a parameter.

The system described is thus capable of distributing the burden of event processing across devices in the hierarchy, so that the processing of rules may be performed by a single device or shared by plural devices, and so that rules may be simply configured and updated for one or plural devices according to device class definitions. The hierarchical arrangement may be fixed according to a client-server model or the like, or may be a dynamic arrangement. In one such dynamic embodiment, a peer-to-peer network (such as a grid or mesh network) with no actual central node allows a central rule engine to be located on one of the peer devices, instead of running on a Cloud or Gateway node, by enabling the mesh or grid of peer devices to dynamically elect one peer device to act as a central node.

In a further refinement, for complex deployments having central configuration and monitoring, there may be provided an extended hierarchical system of central nodes. Such an embodiment would require the central rules engine to support an additional ActionType for the Central Rule Engine (CE) to cause it to forward an event to an upstream central rule engine at a higher level in the hierarchy. In such an extended hierarchy, rule updates can be distributed to other rules engines (including other central rules engines) at lower levels in the hierarchy, identifying them by DeviceClass. In addition, Actions on other such downstream rule engines (including other central rules engines) may be distributed down the hierarchy of devices matched by DeviceClass.

One simple exemplary use case for the disclosed technique could be a system for agricultural irrigation consisting of two classes of devices—soil humidity sensors spread in the field, and sprinklers. In such a distributed system using typically low-cost devices, each device may have a finite battery life and no electricity source, so that once a battery is exhausted an entire device may need to be replaced. A typical specialized application may have the following requirements:

1. Each sensor activates every hour, measures the soil humidity and transmits the measurement to a central management node.
2. Once at least 5 sensors report that humidity is below 20%, the following actions are needed:
    a. Activate all sprinklers; and b. While sprinklers are activated, configure sensors to take humidity measurements every minute.
3. While the sprinklers are activated, each sensor takes humidity measurements every minute and sends the measurements to a central node.
4. Once the average humidity on at least 5 sprinklers exceeds 40%, the following actions are needed:
   a. Deactivate sprinklers; and
   b. Reduce the sensor measurement frequency back to one hour.

At any stage of the process, if the soil humidity measured on at least three sensors exceeds 50%, the system must raise an alert indicating a possible water leakage from the irrigation mechanism.

By applying the disclosed technique, the management of events in such a system may be implemented in a distributed manner to ameliorate the resource constraints of the various electronic devices.

The following table shows an example Rule Set (following the rule conventions defined above) for such an agricultural irrigation system, expressed in the JSON language. It will be clear to one of ordinary skill in the art that other programming language conventions could be used.

Furthermore, the present technique may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as

| Id | RuleName | Condition: | Action |
|---|---|---|---|
| 1 | MeasureHumidity | {Class: Local, Resource: /Temperature, Condition: Less, Value: 20, Interval: 60 mins} | Action1: { Type=SendEvent, Param="/Temperature" } |
| 2 | StartWatering | {Class: Sensors, Resource: Param, Condition: Average, Value: 20, Threshold: 5, Interval: 60 mins} | Action1: { Type: DeviceAction Class: Sprinklers Param: ON} Action2: { Type: ChangeRule, RuleId: 1, NewRule: { RuleOperation: Update, Interval: 1 min, Value: 40, Condition: Greater} } |
| 3 | StopWatering | {Class: Sensors, Resource: Param, Condition: Average, Value: 40, Threshold: 5, Interval: 1 mins} | Action1: { Type: DeviceAction Class: Sprinklers Param: OFF} Action2: { Type: ChangeRule, RuleId: 1, NewRule: { RuleOperation: Update, Interval: 60 min, Value: 20, Condition: Less} } |
| 4 | LeakegeAlert | {Class: Sensors, Resource Param, Condition Average, Value: 50, Threshold: 3, Interval: 60 min} | Action1: { Type: ApplicationAction, Param: Value } |

As will be appreciated by one skilled in the art, the present technique may be embodied as a system, method or computer program product. Accordingly, the present technique may take the form of an entirely hardware embodiment, an entirely software embodiment, or an embodiment combining software and hardware. The components described may thus comprise discrete hardware devices, core elements of devices, software or firmware entities, or hybrid hardware/software/firmware entities.

Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

Such exemplary embodiments include the first approach to the many resource constraints encountered in event management, the described technology providing an electronic event processing apparatus, comprising a first electronic component, at a first level in a hierarchical arrangement, having an identifier and at least one associated action to be performed according to at least one rule triggered by at least one event; a second electronic component, at a second level in the hierarchical arrangement, and operable to receive from the first electronic component the identifier and a definition of the at least one rule; and a communication component connecting the first electronic component and the second electronic component and operable in response to the at least one event to cause performance by at least one of the first electronic component and the second electronic component of the at least one associated action according to the at least one rule.

Additionally, in an embodiment at least one of said first electronic component and said communication component being operable to: test said at least one event; and responsive to a determination that said at least one rule is local to said first electronic component, cause performance by said first electronic component of said at least one associated action according to said at least one rule, and preferably in response to a determination that said at least one rule is shared by said first electronic component and said second electronic component, cause cooperative performance by said first electronic component and said second electronic component of said at least one associated action according to said at least one rule; and preferably also responsive to a determination that said at least one rule is local to said second electronic component, cause performance by said second electronic component of said at least one associated action according to said at least one rule.

Preferably, at least one event comprises a rule change action, said first electronic component being operable to communicate said rule change action to said second electronic component. Preferably, said identifier comprises a device class identifier, said second electronic component being operable, responsive to receipt of rule change action, to communicate said rule change action to at least one third electronic component at said first level in said hierarchical arrangement and having same said device class identifier as said first electronic component.

Preferably, the electronic event processing apparatus, said first electronic component and said second electronic component comprise members of a set of peer components and said hierarchical arrangement is established at initialisation time by an election process conducted among said peer components. Preferably, said third electronic component comprises a member of said set of peer components. Preferably said first electronic component and said second electronic component are located on a single hardware platform, and wherein said communication component comprises an internal bus arrangement. Preferably, said third electronic component being located on a single hardware platform with at least one of said first electronic component and second electronic component, and wherein said communication component comprises an internal bus arrangement. More preferably, at least two of said first electronic component, said second electronic component and said third electronic component being located on different hardware platforms, and wherein said communication component comprises a local-to-remote network arrangement. In embodiments, said communication component comprises at least one of a client-server arrangement, a grid arrangement and a mesh arrangement.

In a further exemplary embodiment there is provided a machine-implemented method of operation of an electronic event processing apparatus, comprising: sending, from a first electronic component at a first level in a hierarchical arrangement to a second electronic component at a second level in said hierarchical arrangement, an identifier and at least one associated action to be performed according to at least one rule triggered by at least one event; receiving at the second electronic component said identifier and a definition of said at least one rule; and responsive to said at least one event, causing, by a communication component in electronic communication between said first electronic component and said second electronic component, at least one of said first electronic component and said second electronic component to perform said at least one associated action according to said at least one rule and testing, by at least one of said first electronic component and said communication component, said at least one event; responsive to a determination that said at least one rule is local to said first electronic component, causing performance by said first electronic component of said at least one associated action according to said at least one rule; responsive to a determination that said at least one rule is shared by said first electronic component and said second electronic component, causing cooperative performance by said first electronic component and said second electronic component of said at least one associated action according to said at least one rule; and responsive to a determination that said at least one rule is local to said second electronic component, causing performance by said second electronic component of said at least one associated action according to said at least one rule. Preferably, the method further comprises, responsive to said at least one event comprising a rule change action, communicating said rule change action to said second electronic component; and wherein said identifier comprises a device class identifier and, responsive to receipt of rule change action, communicating said rule change action to at least one third electronic component at said first level in said hierarchical arrangement and having same said device class identifier as said first electronic component.

In a further exemplary embodiment there is provided an electronic event processing component operable at a level in a hierarchy of components and adapted for operation in electronic communication with at least one further electronic component operable at a different level in a hierarchy of electronic components, and operable to: responsive to receipt from said at least one further electronic component of an identifier and at least one associated action to be performed according to at least one rule triggered by at least one event; and responsive to said at least one event, activating a communication component to cause performance by at least one of said electronic event processing component and said further electronic component of said at least one associated action according to said at least one rule.

In a yet further exemplary embodiment there is provided an electronic component, operable at a level in a hierarchy of electronic components, and adapted for operation in electronic communication with at least one electronic event processing component operable at a different level in a hierarchy of components, and operable to: send an identifier and at least one associated action to be performed according to at least one rule triggered by at least one event to said at least one electronic event processing component; when an event occurs and said at least one rule is local, perform said at least one associated action according to said at least one rule; when an event occurs and said at least one rule is shared, send said event to said at least one electronic event processing component to cause cooperative performance with said at least one electronic event processing component of said at least one associated action according to said at least one rule; and when said at least one rule is local to said second electronic component, send said event to said at least one electronic event processing component to cause performance by said at least one electronic event processing component of said at least one associated action according to said at least one rule.

The invention claimed is:

1. An electronic event processing apparatus, comprising:
a first electronic hardware device, at a first level in a hierarchical arrangement, having an identifier and at least one associated action to be performed according to at least one rule triggered by at least one event;
a second electronic hardware device, at a second level in said hierarchical arrangement, and operable to receive from said first electronic hardware device said identifier and a definition of said at least one rule;
a communication component connecting said first electronic hardware device and said second electronic hardware device and operable in response to said at least one event to cause performance by at least one of said first electronic hardware device and said second electronic hardware device of said at least one associated action according to said at least one rule; wherein, at least one of said first electronic hardware device and said communication component being operable to:
test said at least one event; and
responsive to a determination that said at least one rule is local to said first electronic hardware device, cause performance by said first electronic hardware device of said at least one associated action according to said at least one rule, and responsive to a determination that said at least one rule is shared by said first electronic hardware device and said second electronic hardware device, cause cooperative performance by said first electronic hardware device and said second electronic hardware device of said at least one associated action according to said at least one rule; and responsive to a determination that said at least one rule is local to said second electronic hardware device, cause performance by said second electronic hardware device of said at least one associated action according to said at least one rule.

2. The electronic event processing apparatus of claim 1, wherein said at least one event comprises a rule change action, said first electronic hardware device being operable to communicate said rule change action to said second electronic hardware device.

3. The electronic event processing apparatus of claim 2, wherein said identifier comprises a hardware device class identifier, said second electronic hardware device being operable, responsive to receipt of rule change action, to communicate said rule change action to at least one third electronic hardware device at said first level in said hierarchical arrangement and having same said hardware device class identifier as said first electronic hardware device.

4. The electronic event processing apparatus of claim 3, wherein said first electronic hardware device and said second electronic hardware device comprise members of a set of peer components and said hierarchical arrangement is established at initialisation time by an election process conducted among said peer components.

5. The electronic event processing apparatus of claim 4, wherein said third electronic hardware device comprises a member of said set of peer components.

6. The electronic event processing apparatus of claim 3, at least two of said first electronic hardware device, said second electronic hardware device and said third electronic hardware device being located on different hardware platforms, and wherein said communication component comprises a local-to-remote network arrangement.

7. The electronic event processing apparatus of claim 6, said communication component comprising at least one of a client-server arrangement, a grid arrangement and a mesh arrangement.

8. The electronic event processing apparatus of claim 1, said first electronic hardware device and said second electronic hardware device being located on a single hardware platform, and wherein said communication component comprises an internal bus arrangement.

9. The electronic event processing apparatus of claim 8, said third electronic hardware device being located on a single hardware platform with at least one of said first electronic hardware device and second electronic hardware device, and wherein said communication component comprises an internal bus arrangement.

10. A machine-implemented method of operation of an electronic event processing apparatus, comprising:
sending, from a first electronic component at a first level in a hierarchical arrangement to a second electronic component at a second level in said hierarchical arrangement, an identifier and at least one associated action to be performed according to at least one rule triggered by at least one event;
receiving at the second electronic component said identifier and a definition of said at least one rule; and responsive to said at least one event, causing, by a communication component in electronic communication between said first electronic component and said second electronic component, at least one of said first electronic component and said second electronic component to perform said at least one associated action according to said at least one rule and testing, by at least one of said first electronic component and said communication component, said at least one event;

responsive to a determination that said at least one rule is local to said first electronic component, causing performance by said first electronic component of said at least one associated action according to said at least one rule;

responsive to a determination that said at least one rule is shared by said first electronic component and said second electronic component, causing cooperative performance by said first electronic component and said second electronic component of said at least one associated action according to said at least one rule; and responsive to a determination that said at least one rule is local to said second electronic component, causing performance by said second electronic component of said at least one associated action according to said at least one rule.

11. The method of claim 10 further comprising, responsive to said at least one event comprising a rule change action, communicating said rule change action to said second electronic component; and wherein said identifier comprises a device class identifier and, responsive to receipt of rule change action, communicating said rule change action to at least one third electronic component at said first level in said hierarchical arrangement and having same said device class identifier as said first electronic component.

12. A computer program comprising computer program code to, when loaded into a computer system and executed thereon, cause said computer system to perform all the steps of the method of claim 10.

13. An electronic hardware device, operable at a level in a hierarchy of electronic components, and adapted for operation in electronic communication with at least one electronic event processing component operable at a different level in a hierarchy of components, and operable to:

send an identifier and at least one associated action to be performed according to at least one rule triggered by at least one event to said at least one electronic event processing component;

when an event occurs and said at least one rule is local to said electronic hardware device, perform said at least one associated action according to said at least one rule;

when an event occurs and said at least one rule is shared, send said event to said at least one electronic event processing component to cause cooperative performance with said at least one electronic event processing component of said at least one associated action according to said at least one rule; and when said at least one rule is local to said electronic event processing component, send said event to said at least one electronic event processing component to cause performance by said at least one electronic event processing component of said at least one associated action according to said at least one rule.

* * * * *